United States Patent
Geng et al.

(10) Patent No.: US 10,387,103 B2
(45) Date of Patent: Aug. 20, 2019

(54) METHOD AND APPARATUS FOR PROCESSING DATA OF A MICROPHONE OF A TERMINAL, AND TERMINAL

(71) Applicants: Hisense Mobile Communications Technology Co., Ltd., Qingdao (CN); HISENSE USA CORP., Suwanee, GA (US); Hisense International Co., Ltd., Qingdao (CN)

(72) Inventors: Bingyu Geng, Qingdao (CN); Liang An, Qingdao (CN); Weibo Zheng, Qingdao (CN)

(73) Assignees: Hisense Mobile Communications Technology Co., Ltd., Qingdao (CN); Hisense USA Corp., Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/892,914

(22) Filed: Feb. 9, 2018

(65) Prior Publication Data

US 2018/0225080 A1    Aug. 9, 2018

(30) Foreign Application Priority Data

Feb. 9, 2017    (CN) .......................... 2017 1 0072226

(51) Int. Cl.
G06F 3/16    (2006.01)
(52) U.S. Cl.
CPC .............. *G06F 3/162* (2013.01); *G06F 3/165* (2013.01)
(58) Field of Classification Search
None
See application file for complete search history.

(56) References Cited

U.S. PATENT DOCUMENTS

2002/0194388 A1*  12/2002  Boloker ................... G06F 8/38
                                                        719/310
2003/0088421 A1*  5/2003  Maes ....................... G10L 15/30
                                                        704/270.1
(Continued)

FOREIGN PATENT DOCUMENTS

| CN | 201374053 Y | 12/2009 |
|---|---|---|
| CN | 106101367 A | 11/2016 |
| EP | 1 096 496 A2 | 5/2001 |

OTHER PUBLICATIONS

First Office Action with English Translation for Chinese Patent Application No. 201710072226.6 dated Mar. 8, 2019; 10 pages.

*Primary Examiner* — Shih-Wei Kraft
(74) *Attorney, Agent, or Firm* — Brinks Gilson & Lione

(57) ABSTRACT

Methods and apparatuses that provide a technical solution for handling a microphone operation request from more than one application is disclosed. The technical solution for processing data obtained by a microphone of a terminal device includes receiving an audio recording start command sent by a second application running on the terminal while the microphone is being used by a first application running on the terminal. The technical solution further includes assigning an unoccupied data receiving port to the second application, acquiring and broadcasting audio recording data collected by the microphone through a data sending port, receiving the audio recording data by the assigned data receiving port, and sending the audio recording data to the second application by the assigned data receiving port.

9 Claims, 4 Drawing Sheets

(56) References Cited

U.S. PATENT DOCUMENTS

| 2009/0055831 A1* | 2/2009 | Bauman | G06F 9/5077 718/104 |
| 2012/0072524 A1* | 3/2012 | White | G06F 16/40 709/213 |
| 2013/0089026 A1* | 4/2013 | Piper | H04W 4/00 370/328 |

* cited by examiner

METHOD AND APPARATUS FOR PROCESSING DATA OF A MICROPHONE OF A TERMINAL, AND TERMINAL

CROSS-REFERENCE TO RELATED APPLICATION(S)

This application claims priority to Chinese Patent Application No. 201710072226.6, filed on Feb. 9, 2017, titled "METHOD FOR PROCESSING DATA OF A MICROPHONE OF A TERMINAL, AND TERMINAL WITH A MICROPHONE", the entirety of which is hereby incorporated by reference herein.

TECHNICAL FIELD

The present disclosure relates to mobile terminal technologies, and in particular, to a method and an apparatus for processing data of a microphone of a terminal and a terminal with a microphone.

BACKGROUND

In an age of mobile Internet, with the spread and popularization of intelligent terminals, audio recording functions of the intelligent terminals are becoming more and more intelligent. For example, in the intelligent terminal with an Android system, an audio recording function of a microphone of the intelligent terminal may be used by an audio recorder, voice recognition, a voice search, a video call and other applications on the intelligent terminal.

SUMMARY

According to some embodiments of the present disclosure, a method is provided for processing data of a microphone of a terminal. The terminal includes a data sending port which is capable of communicating with the microphone, and a plurality of data receiving ports which have a many-to-one mapping relationship with the data sending port. The method comprises:

receiving an audio recording start command sent by a second application running on the terminal during that the microphone is being used by a first application running on the terminal;

assigning a data receiving port to the second application from at least one data receiving port, which is unoccupied, of the plurality of data receiving ports;

acquiring, using the data sending port, audio recording data collected by the microphone;

broadcasting, using the data sending port, acquired audio recording data;

receiving, using assigned data receiving port, the audio recording data broadcasted from the data sending port; and sending, using the assigned data receiving port, received audio recording data to the second application.

According to another embodiment of the present disclosure, an apparatus is provided for processing data of a microphone of a terminal. The apparatus is connected to the microphone, and includes a receiver and a processor. The processor includes a data sending port and a plurality of data receiving ports which have many-to-one mapping relationship with the data sending port, wherein, the receiver is configured to receive an audio recording start command sent by a second application running on the terminal during that the microphone is being used by a first application running on the terminal; and the processor is configured to:

upon receiving the audio recording start command by the receiver, assign a data receiving port to the second application from at least one data receiving port, which is unoccupied, of the plurality of data receiving ports;

acquire, using the data sending port, audio recording data collected by the microphone;

broadcast, using the data sending port, acquired audio recording data;

receive, using assigned data receiving port, the audio recording data broadcasted from the data sending port; and send, using the assigned data receiving port, received audio recording data to the second application.

According to another embodiment of the present disclosure, a terminal device is provided, the terminal including a microphone and a processer connected to the microphone, wherein the processor includes a data sending port which is capable of communicating with the microphone and a plurality of data receiving ports which have a many-to-one mapping relationship with the data sending port, and wherein the processor is configured to:

receive an audio recording start command sent by a second application running on the terminal during that the microphone is being used by a first application running on the terminal;

assign a data receiving port to the second application from at least one data receiving port, which is unoccupied, of the plurality of data receiving ports;

acquire, using the data sending port, the audio recording data;

broadcast, using the data sending port, acquired audio recording data;

receive, using assigned data receiving port, the audio recording data broadcasted from the data sending port; and send, using the assigned data receiving port, received audio recording data to the second application.

BRIEF DESCRIPTION OF THE DRAWINGS

In order to describe technical solutions in the embodiments of the present disclosure more clearly, the accompanying drawings to be used in the description of embodiments will be introduced briefly. The drawings illustrate some embodiments of the present disclosure and are not limiting, as a person of ordinary skill in the art can obtain other drawings according to those drawings without involving any creative effort.

DETAILED DESCRIPTION

The technical solutions in the embodiments of the present disclosure will be clearly and completely described below with reference to the accompanying drawings in the embodiments of the present disclosure. The described embodiments may describe some but not all of the embodiments of the present disclosure. All other embodiments made on the basis of the embodiments of the present disclosure understood by a person of ordinary skill in the art without paying any creative effort are within the scope of the present disclosure.

In the embodiments of the present disclosure, the term "and/or", such as A and/or B, is merely an association relationship for describing associated objects, and indicates that there may be three relationships. For example, A and/or B may mean that A exists alone, that A and B coexist, and that B exists alone. In addition, the character "/" in the embodiments of the present disclosure generally indicates that the relationship between the associated objects is "or".

In order to describe the technical solutions of the embodiments of the present disclosure clearly, in the embodiments of the present disclosure, the terms "first" and "second" are merely used for a purpose of description and should not be understood as indicating or implying relative importance or impliedly indicating the number of indicated technical features. Therefore, although a feature is defined by the term "first" or "second" in the embodiments of the present disclosure, there may be one or more this features in these embodiments. In addition, the singular forms "a", "an" and "the" used in this specification and the appended claims include plural referents unless the content clearly dictates otherwise. In the description of the present disclosure, the term "a plurality of" means two or more unless otherwise specified.

Figure 1:
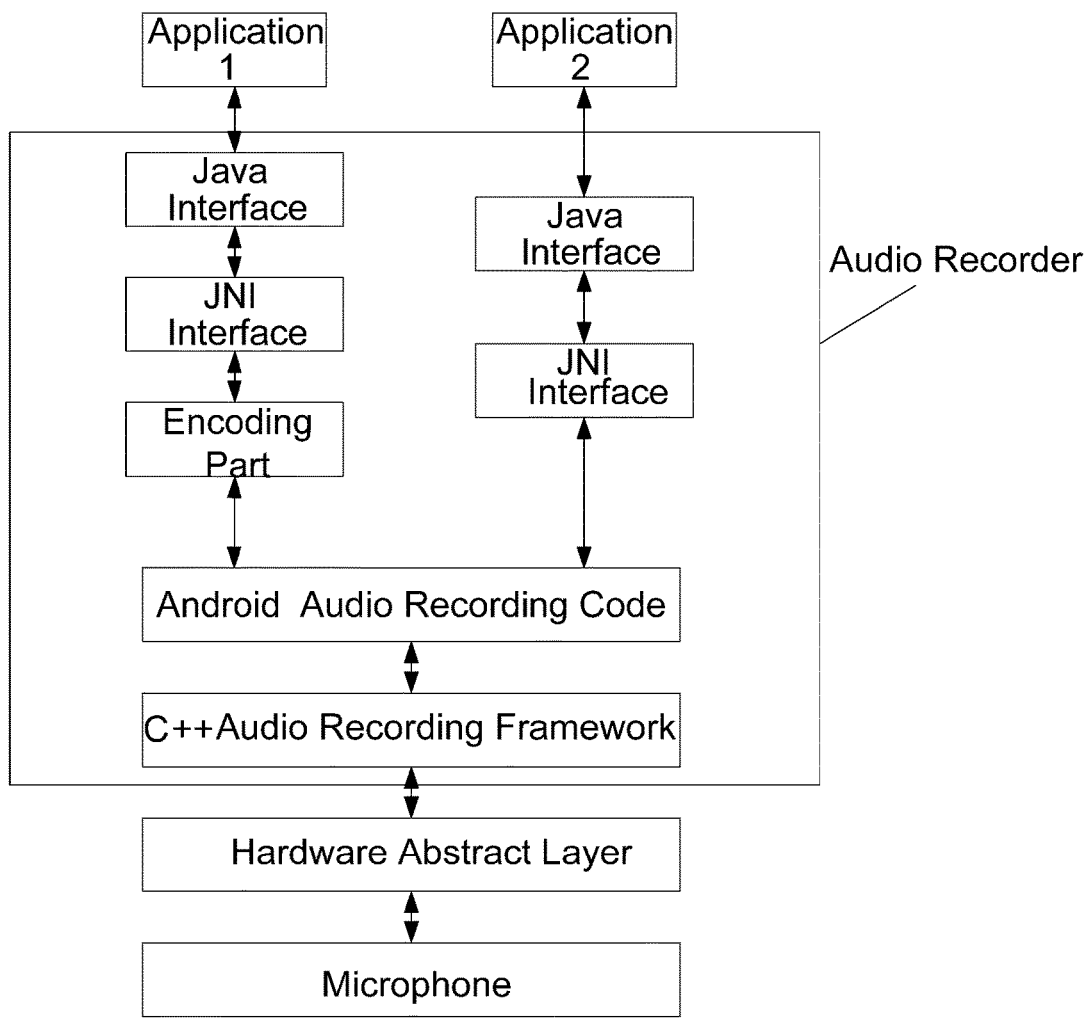
FIG. 1 is a framework diagram for showing that an application enables an audio recording function and obtains audio recording data.

As shown in FIG. 1, modules which are usually used to obtain audio recording data include a plurality of applications, an audio recorder of an operating system, a hardware abstraction layer (HAL), an audio recording hardware (including a microphone and a DSP, etc. For the convenience of the following description, the audio recording hardware is represented by the microphone). The plurality of applications may include a sound recording application, a voice input application, a voice search application, etc., which need to record sound. The plurality of applications may enable the audio recording function of the microphone. The audio recorder of the operating system may belong to an Android operating system, and may include a Framework application framework for transferring an audio recording start command and audio recording data. The HAL is an interface layer between an operating system kernel (Linux kernel driver) and the audio recorder in the upper layer, and is used for abstracting the hardware. The microphone is used to collect audio recording data according to the audio recording start command. The audio recorder of the operating system includes Java interface, JNI interface (interface between C++ and Java), AudioRecord.cpp (Android audio recording code), C++ audio recording framework (Audio Record Thread), etc.

In general, there are two ways for the plurality of the application to record sound, one (which may be used in for example the sound recording application, a video application and other applications) is to obtain encoded data through the MediaRecorder (a class in Android framework) of the Java interface, and the other (which may be used in for example a voice recognition application, a voice command application, the voice search application, a video call application, the voice input application and other applications) is to obtain the original data through AudioRecord (a class in Android framework) of the Java interface. The difference between the two ways lies in the process of Java interface→JNI interface (interface between C++ and Java) C++ audio recording framework.

Specifically, the way of MediaRecorder is as follows: Application→MediaRecorder (java)→MediaRecorder (JNI) →Encoding part (StagefrightRecorder)→AudioRecord.cpp→AudioRecordThread→HAL→Microphone.

The way of AudioRecord is as follows: Application→AudioRecord (java)→AudioRecord (JNI)→AudioRecord.cpp→AudioRecordThread→HAL→Microphone.

It should be noted that part or all of the above solutions may be selectively combined in the present disclosure.

It should also be noted that the applications may be of various types, and then may have different needs, so different audio recording parameters, such as the sampling rate, the channel number, the audio recording format, etc., need to be set. Audio recording parameters set by an application are transferred to the microphone through the above procedure. After the microphone receives the audio recording start command and is turned on according to the audio recording parameters in the audio recording start command, it may collect audio recording data according to the audio recording parameters, and then the collected audio recording data may be transmitted from the microphone to the application in the reverse order to the above sequence. During the process that the microphone collects audio recording data with the audio recording parameters set by the application, if a second application needs to use the audio recording function, the second application will be prevented from using the audio recording function in order to prevent parameter conflicts, and then the operating system will report an error. In this case, the second application can't use the audio recording function, and then can't obtain audio recording data from the microphone.

In order to solve the above problem, some embodiments of the present disclosure disclose a method for processing data of a microphone of a terminal device. The method for processing data of the microphone of the terminal will be described in detail below with reference to FIGS. 2 and 3.

In the embodiments of the present disclosure, "a plurality of applications simultaneously enable an audio recording function" means that the plurality of applications use the audio recording function at the same time, or that after at least one of the plurality of applications enables the audio recording function and before it disables the audio recording function, other applications in the plurality of applications use the audio recording function. In addition, the application using the microphone means that the application enables and uses the audio recording function.

Figure 2:
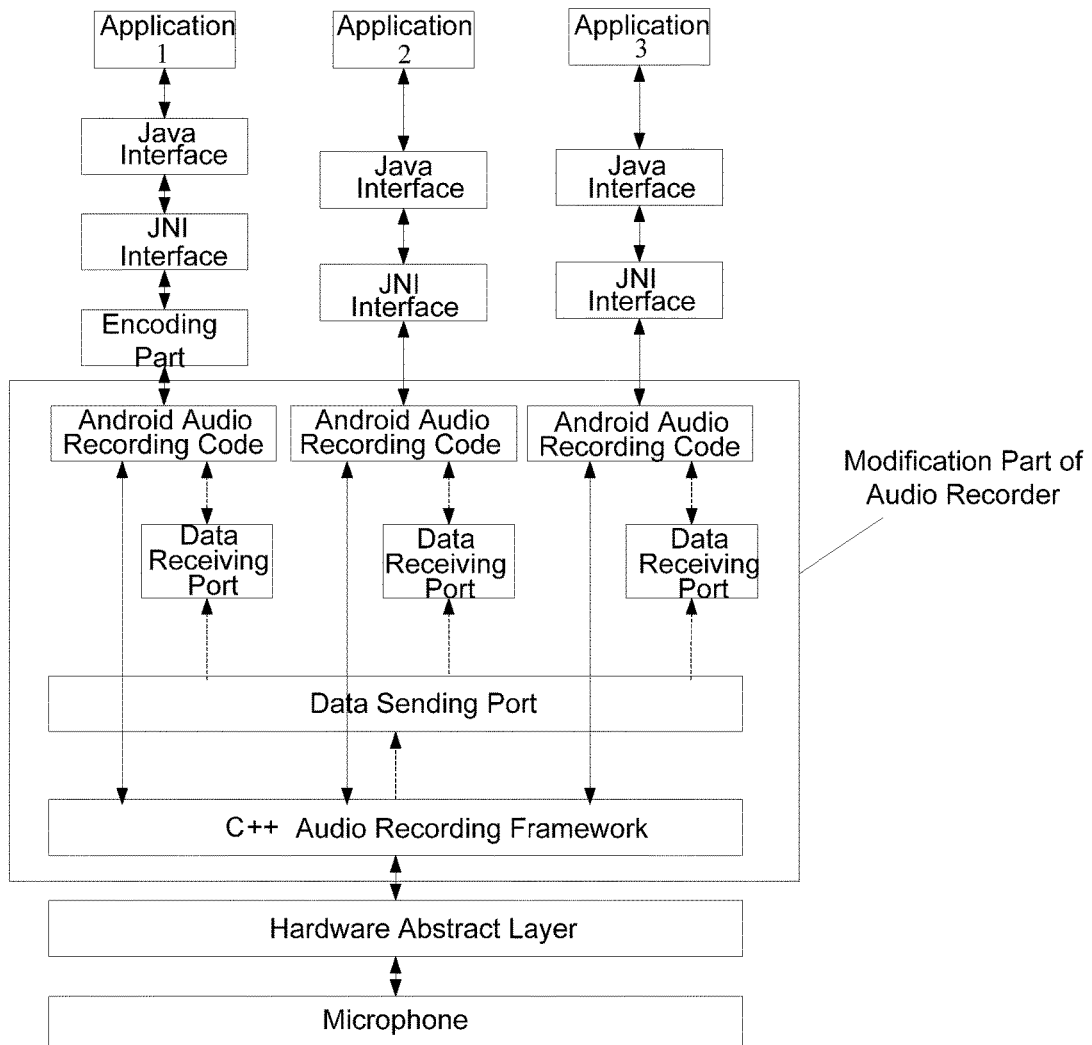
FIG. 2 is a framework diagram for showing that an application enables an audio recording function and obtains audio recording data provided by some embodiments of the present disclosure.

As shown in FIG. 2, the working principle of the method for processing data of a microphone of a terminal provided by the embodiments of the present disclosure is to modify the code (i.e., Android audio recording code in the audio recorder) between the JNI interface and the HAL layer, and the C++ audio recording framework. That is, only the Android audio recording code and the C++ audio recording framework are modified to convert the single thread shown in FIG. 1 into a plurality of threads shown in FIG. 2, without modifying the plurality of applications, the Java interface, the JNI interface (wherein the interface is not modified to ensure the compatibility of existing and future applications), the hardware abstraction layer and the audio recording hardware part (i.e., the microphone), so that the plurality of applications may obtain audio recording data simultaneously, thereby realizing that the plurality of applications enable the audio recording function simultaneously. That is to say, the embodiments of the present disclosure realize that the audio recording function is enabled by the plurality of applications in the terminal at the same time by only modifying the software part, without modifying the plurality of applications and the hardware part.

In some embodiments of the present disclosure, the Android audio recording code and the C++ audio recording framework are modified in the procedure for obtaining audio recording data, that is, a data sending port (protocol port) and a plurality of data receiving ports are added between the Android audio recording code and the C++ audio recording framework. The procedure for obtaining audio recording data is realized in two ways. One way is that the processes for sending down an audio recording start command and uploading the audio recording data as shown in FIG. 1 are retained, and that the method for uploading audio recording data via the data sending port and the plurality of data receiving ports as shown in FIG. 2 are added. The other way is that the process of sending down an audio recording start command as shown in FIG. 1 is retained, and that the method for uploading the audio recording data as shown in FIG. 1 is replaced by the method for uploading the audio recording data via the data sending port and the plurality of data receiving ports as shown in FIG. 2. As shown in FIG. 2 (in which the solid arrows indicate the process for sending down the audio recording start command and uploading the audio recording data in FIG. 1, and the broken arrows indicate the process for uploading the audio recording data added by the embodiment of the present disclosure; three applications enabling the audio recording function at the same time are taken as an example in FIG. 2), data may be reused by a way that similar to network service, that is, a data sending port and N data receiving ports are added between the Android audio recording code and C++ audio recording framework, where N is an integer greater than or equal to 2.

A data receiving port, which is from at least one data receiving port that is unoccupied among the N data receiving ports, is assigned to an application that needs to acquire audio recording data. The data sending port is used to receive audio recording data from the C++ audio recording framework, and then to send the audio recording data to N data receiving ports by broadcasting. After the data receiving port occupied by the application receives the audio recording data, it sends the data to the application.

Figure 3:
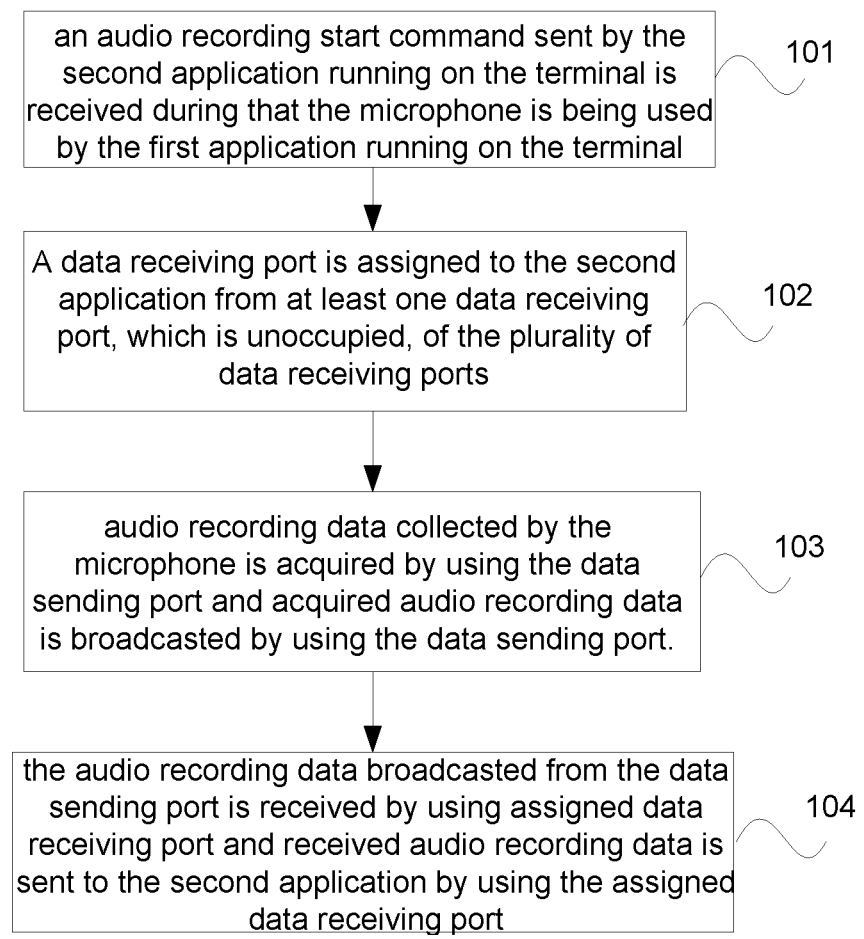
FIG. 3 is a flowchart of a method for processing data of a microphone of a terminal provided by some embodiments of the present disclosure.

In the method for processing data of the microphone of the terminal provided by the embodiments of the present disclosure, an execution body of the method is the terminal or software/hardware in the terminal. For example, the method is performed by the audio recorder in the terminal. The terminal includes a data sending port which is capable of communicating with the microphone and a plurality of data receiving ports which have a many-to-one mapping relationship with the data sending port. The data sending port may communicate with each of the plurality of data receiving ports under some protocol. For example, the data sending port may communicate with each of the plurality of data receiving ports under a User Datagram Protocol (UDP), as the UDP is relatively simple and meets the requirements of the embodiments of the present disclosure. In an example, the data sending port also communicates with each of the plurality of data receiving ports under another protocol such as a Transmission Control Protocol (TCP), which is not limited herein. Referring to FIG. 3, the method includes the following steps 101-104.

In step 101, an audio recording start command sent by the second application running on the terminal is received during that the microphone is being used by the first application running on the terminal.

In some embodiments of the present disclosure, this step is executed in a situation that the second application sends an audio recording start command and needs to obtain audio recording data while the first application can also obtain the audio recording data. The first application refers to any application that is using the microphone before the second application sends the audio recording start command, that is, any application that has enabled the audio recording function and is using the audio recording function. If the first application is the application that enables the audio recording function first, the first application may send down the audio recording start command and receive the audio recording data completely according to the method shown in FIG. 1. Alternatively, if the first application is an application that enables the audio recording function first, the first application may send down the audio recording start command according to the method shown in FIG. 1, and receive the audio recording data according to method for uploading the audio recording data via the data sending port and the plurality of data receiving ports, which is provided in embodiments of the present disclosure.

If there is an application which needs to enable the audio recording function of the terminal, the application may send an audio recording start command to the terminal. The audio recording start command may include at least one audio recording parameter required by the application, a microphone start command, and a command for returning audio recording data. The at least one audio recording parameter includes one or more of the following parameters: sampling rate, channel number, and audio recording format. For example, the at least one audio recording parameter includes parameters for setting audio recording effect, such as sample rate, channel number and audio recording format, so that the audio recording data required by the application may be obtained.

The terminal receives the audio recording start command, and sends it to the microphone. For example, the terminal obtains an audio recording start command of the application by invoking the Java interface, the JNI interface, the Android audio recording code, and the C++ audio recording framework in sequence, sends the audio recording start command to the hardware abstraction layer, and uses the hardware abstraction layer to turn on the microphone.

The terminal may turn on the microphone according to the microphone start command from the application that enables the audio recording function first. After the microphone is turned on, audio recording parameters are configured to the microphone according to the audio recording parameters in the audio recording start command, or according to preset audio recording parameters. The preset audio recording parameters are set before the terminal leaves the factory or are set before the terminal is used for a certain time. Usually, the audio recording parameters are not modified during the usage of the microphone.

Usually, audio recording data is collected by the microphone according to the fixed audio recording parameters set by the factory, and then converted through other hardware components such as DSP, to obtain converted audio recording data required by the application. Then the converted audio recording data is returned to the C++ audio recording framework via the hardware abstraction layer, and finally returned to the application step by step. In some embodiments of the present disclosure, the microphone represents a recording hardware part (including a DSP, a microphone, etc.), rather than just an actual microphone, so the audio recording parameters of the microphone may be set.

With regard to the applications that enable the audio recording function since the application that enables the audio recording function secondly, that is, the applications which enable the audio recording function during that the microphone is recording, after the terminal transmit the audio recording start commands of the applications, the applications may receive a message for indicating that it fails to enable the audio recording function via the C++ audio recording framework and Android audio recording code. The message means that there is another application that has enabled the microphone and the microphone is turned on. In this case, steps 102-104 are executed.

For example, the message for indicating the failure may be a return value of the audio recording start command. If a "failure" is returned, it means that the microphone is occupied and is turned on. Alternatively, if the application fails to enable the audio recording function, other preset value may be returned, such as "No", "can't", "0", etc. Each of these values may indicate that the microphone is occupied and is turned on. The return value of the audio recording start command may also be "successful", "Yes", "Can", "1", etc., each of which indicates that the microphone is not occupied and is turned off. Alternatively, the audio recording data may be returned directly without returning any value.

In step 102, a data receiving port is assigned to the second application from at least one data receiving port, which is unoccupied, of the plurality of data receiving ports.

The terminal may assign a data receiving port to the second application from at least one data receiving port, which is unoccupied, among the plurality of data receiving ports through AudioRecord.cpp. For example, the plurality of data receiving ports are N data receiving ports, where N is an integer which is greater than or equal to two. N data receiving ports may be assigned to M applications in sequence, where M is a positive integer less than or equal to N. For example, N data receiving ports are numbered, and then are sequentially assigned to M applications. N data receiving ports may also be randomly assigned to a plurality of applications. For example, if a port is assigned to an application and the port is already occupied, a next port is assigned to the application until the application is assigned an unoccupied port.

In some embodiments of the present disclosure, the first application is assigned another data receiving port from the at least one data receiving port, which is unoccupied, of the plurality of data receiving ports. If the first application is the application that enables the audio recording function first, the first application may be allocated another data receiving port of at least one unoccupied data receiving port of the plurality of data receiving ports, or may not be assigned the another data receiving port of at least one unoccupied data receiving port of the plurality of data receiving ports. If an application is not the application that enables the audio recording function first, the application is assigned another data receiving port of the at least one unoccupied data receiving ports of the plurality of data receiving ports.

In step 103, audio recording data collected by the microphone is acquired by the data sending port and acquired audio recording data is broadcasted by the data sending port.

In some embodiments of the present disclosure, after a certain amount of audio recording data is collected by the microphone, the data is returned to the C++ audio recording framework via the hardware abstraction layer. If the first application obtains the audio recording data according to the method as shown in FIG. 1, the audio recording data is copied by the C++ audio recording framework. Then a copy of the audio recording data is returned to the Android audio recording code directly, and then returned to the first application via the Android audio recording code. In addition, another copy of the audio recording data is sent to the data sending port, and then is broadcasted via the data sending port. If the first application obtains the audio recording data according to the method in the embodiments of the present disclosure, the audio recording data may be directly sent to the data sending port by the C++ audio recording framework, and then be broadcasted by using the data sending port.

The process that the terminal uses the data sending port to obtain the audio recording data collected by the microphone is described blow. In an example, a command for obtaining audio recording data is sent to the C++ audio recording framework from the data sending port, and then the audio recording data is copied and sent to the data sending port by the C++ audio recording framework. In another example, after acquiring the audio recording data collected by the microphone, the C++ audio recording framework sends the recording data to the data sending port actively. For example, the above process may be implemented in such a way that a program code for copying and sending the audio recorded data is added in the C++ audio recording framework of the terminal, or that an original program code for sending the audio recording data to the Android audio recording code in the C++ audio recording framework of the terminal is changed to a program code for sending audio recording data to the data sending port.

After receiving the audio recording data, the data sending port sends the audio recording data to N data receiving ports in a way of broadcasting. The C++ audio recording framework may also send the audio recording data to the Android audio recording code, thereby returning the audio recording data to the first application. If the first application disables the audio recording function, the C++ audio recording framework does not need to send the audio recording data to the Android audio recording code again.

In step 104, the audio recording data broadcasted from the data sending port is received by using assigned data receiving port and received audio recording data is sent to the second application by using the assigned data receiving port.

The terminal uses the data receiving port assigned to the second application to receive the audio recording data and uses the Android audio recording code, the JNI interface, the Java interface, etc. to return the audio recording data to the second application. It should be noted that, in some embodiments of the present disclosure, the process that terminal returns the audio recording data to the second application is taken as an example to describe the process of obtaining audio recording data through the data sending port, the data receiving ports, the Android audio recording code, the JNI interface, the Java interface, etc.

During the entire audio recording process, the microphone collects audio recording data according to at least one fixed audio recording parameter all the time. The at least one fixed audio recording parameter may be audio recording parameters required by the application which enables the audio recording function first, that is, audio recording parameters required by other applications will not be used in the microphone. The at least one fixed recording parameter may also be audio recording parameters preset by the system, that is, the audio recording parameters required by all the applications will not be used in the microphone. In addition, the content of the audio recording data returned to the application should be required by the application, but the audio recording effect may not be needed by the application. That is, the audio recording parameters of the audio recording data returned to the application may not meet the need of the application. Therefore, in an example, the audio recording data collected by the microphone may be directly returned to the application, and the parameters of the returned audio recording data may not meet the need of the application. In another example, the audio recording data required for the application may be returned to the application.

In some embodiments of the present disclosure, before the audio recording data collected by the microphone is returned to the second application, the audio recording data is converted according to the at least one audio recording parameter required by the second application. The way for converting the data here may be a conventional way for converting audio recording parameter as long as it can convert the audio recording data into data required by the second application. For example, the audio recording data may be resampled according to the at least one audio recording parameter required by the second application to obtain the audio recording data required by the second application.

In an example, the resampling process may be performed by the data receiving port, that is, the audio recording data is resampled by the data receiving port after it receives the audio recording data. In another example, the resampling process may also be performed by the Android audio recording code, that is, after the audio recording data is received by the data receiving port and returned to the Android audio recording code, the Android audio recording code may resample the audio recording data. In a further sample, after the audio recording data is obtained by the C++ audio recording framework and returned to the Android audio recording code, the Android audio recording code may resample the audio recording code. Of course, the process of resampling may also be performed in the JNI interface or Java interface, which will not be repeated here.

In some embodiments of the present disclosure, if the audio recording data collected by the microphone is the audio recording data collected by the microphone according to the at least one audio recording parameter required by the application that enables the audio recording function first, the audio recording data is the data required by the application, and the terminal may directly return the audio recording data to the application.

In some embodiments of the present disclosure, after the audio recording function is disabled by an application, the data receiving port assigned by the terminal to the application is released. It will be understood that the data receiving port assigned by the terminal for the application is the data receiving port occupied by the application.

In some embodiments of the present disclosure, after the audio recording function is disabled by the application which occupies the data receiving port, the data receiving port is not released.

In some embodiments of the present disclosure, in response to that the audio recording function is disabled by the application which occupies the data receiving port, the data receiving port is released, and then the data receiving port is available for reuse by another application. In this way, an occupied space and the number of ports occupied may be saved and the ports may be reused, thereby saving the entire execution time of the process. For example, in a situation that the audio recording function is disabled by the application which occupies the data receiving port and data is still returned to the application by the data receiving port, if a new application is needed to be assigned a data receiving port unoccupied, a data receiving port unoccupied may be assigned to the new application by multiple tries over time.

In some embodiments of the present disclosure, if an application is the application that enables the audio recording function first and the application acquires the audio recording data according to the method shown in FIG. 1, that is, the application does not occupy the data receiving port, in response to that the audio recording function is disabled by the application, audio recording data is no longer sent to the Android audio recording code by the C++ audio recording framework. That is, the path for acquiring the data by the application is closed, while the microphone is not turned off and the C++ audio recording framework may still obtain the audio recording data from the microphone and send the audio recording data to the data sending port.

In some embodiments of the present disclosure, if the audio recording function is disabled by all applications that enable the audio recording function, the microphone and the audio recorder are turned off.

In some embodiments of the present disclosure, only one application enables the audio recording function. In an example, the audio recorder sends down an audio recording start command by using the method shown in FIG. 1, and uploads the audio recording data according to the method provided by the above embodiments of the present disclosure. In another example, the audio recorder sends down the audio recording start command and uploads the audio recording data by using the method shown in FIG. 1. In this way, the complexity of the process may be reduced.

In some embodiments of the present disclosure, two applications enable the audio recording function. In an example, for the application of the two applications that has the audio recording function enabled first, the audio recorder may send down the recording start command according to the method shown in FIG. 1, and upload the audio recording data according to the method provided by the above embodiments of the present disclosure. In another example, the audio recorder may send down the recording start command and upload the audio recording data according to the method shown in FIG. 1. For the application that enables the audio recording function secondly, during the application, which has the audio recording function enabled first, uses the audio recording function, the audio recorder may send down the audio recording start command and upload the audio recording data by using the method provided in the above embodiments of the present disclosure.

In some embodiments of the present disclosure, three applications enable the audio recording function. For the application of the three applications that has the audio recording function enabled first, the audio recorder may send down the audio recording start command according to the method shown in FIG. 1 and upload the audio recording data using the method provided by the above embodiments of the present disclosure. In another example, the audio recorder may send down the audio recording start command and upload the audio recording data according to the method shown in FIG. 1. For the two other applications which start the audio recording function secondly and thirdly respectively during that the application that has the audio recording function first is still using the audio recording function, the audio recorder may send down the audio recording start command and upload the audio recording data according to the method provided in the above embodiments of the present disclosure.

In some embodiments of the present disclosure, three applications enable the audio recording function. For the application of the three applications that has the audio recording function enabled first, the audio recorder may send down the audio recording start command according to the method shown in FIG. 1 and upload the audio recording data by using the method provided by the above embodiments of the present disclosure. In another example, the audio recorder may also send down the audio recording start command and upload the recording data by using the method shown in FIG. 1. For the application that enables the audio recording function secondly during that the application that has the audio recording function enabled first is still using the audio recording function, the audio recorder may send down the audio recording start command and upload the audio recording data by using the method provided by the above embodiments of the present disclosure. For the application that enables the audio recording function thirdly during that the application that has the audio recording function enabled first has disabled the audio recording function and the application that has the audio recording function enabled secondly is still using the audio recording function, the audio recorder may send down the audio recording start command and upload the audio recording data by using the method provided in the above embodiments of the present disclosure.

In the method for processing data of a microphone of a terminal provided by the embodiments of the present disclosure, after the microphone is turned on by the first application, the audio recording data is sent back to the second application via the plurality of data receiving ports, data sending port, etc. In this way, the data may be reused in a similar way as network service, thereby solving the problem that when an application is using a microphone, other applications can't enable the audio recording function.

Figure 4:
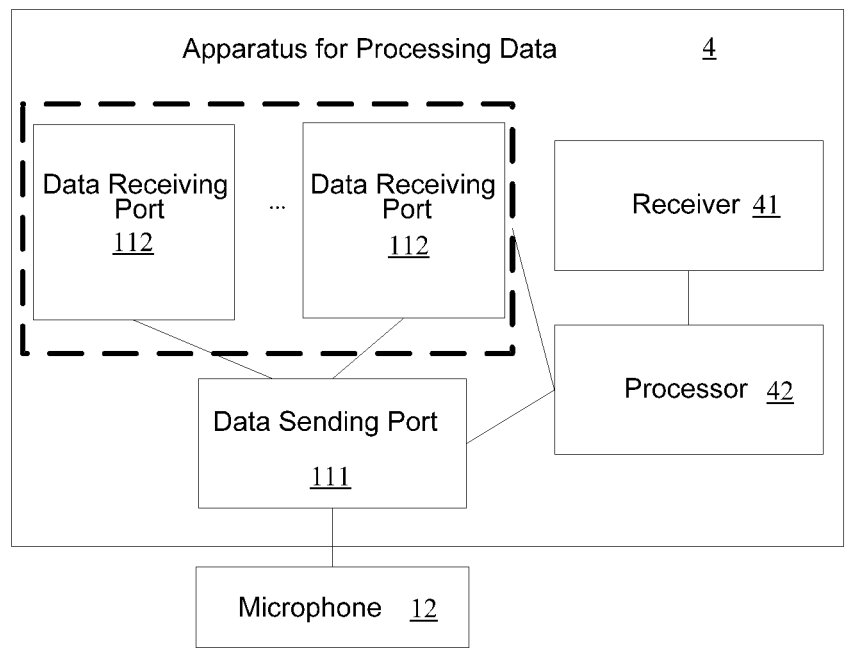
FIG. 4 is a block diagram of an apparatus for processing data of a microphone of a terminal provided by some embodiments of the present disclosure.

Some embodiments of the present disclosure provide an apparatus for processing data of a microphone of a terminal. As shown in FIG. 4, the apparatus 4 is connected to the microphone 12. The apparatus 4 includes a receiver 41 and a processor 42. The processor 42 includes a data sending port 111 and a plurality of data receiving ports 112 which have a many-to-one mapping relationship with the data sending port 111.

The receiver 41 is configured to receive an audio recording start command sent by a second application running on the terminal during that the microphone 12 is being used by the first application running on the terminal. In addition, the processor 41 is configured to, upon receiving the recording start command by the receiver, assign a data receiving port 112 to the second application from at least one data receiving port 112, which is unoccupied, of the plurality of data receiving ports 112. The processor 41 is further configured to acquire the audio recording data collected by the microphone 12 by using the data sending port 111. In addition, the processor 14 is configured to broadcast acquired audio recording data by using the data sending port. Furthermore, the processor is configured to receive the audio recording data broadcasted from the data sending port by using assigned data receiving port. In addition, the processor 41 is configured to send received audio recording data to the second application by using the assigned data receiving port.

In the apparatus for processing data of the microphone of the terminal provided in the embodiments of the present disclosure, the apparatus is configured to, in response to that the microphone is turned on by the first application, send acquired audio recording data back to the second application through the plurality of data receiving ports 112 and the data sending port 111 allocated for the second application. In this way, the data may be reused in a similar way as the network service, thereby solving the problem that other applications can't enable the audio recording function during that the microphone is used by an application.

In some embodiments of the present disclosure, the recording start command includes at least one audio recording parameter required by the second application, and the at least one audio recording parameter includes one or more of following parameters: sampling rate, channel number, and audio recording format.

In some embodiments of the present disclosure, the processor 42 is configured to, before sending the received audio recording data to the second application, convert the received audio recording data collected by the microphone 12 according to the at least one audio recording parameter required by the second application.

In some embodiments of the present disclosure, the first application is assigned another data receiving port 112 from the at least one data receiving port, which is unoccupied, of the plurality of data receiving ports.

In some embodiments of the present disclosure, the data sending port 111 is capable of communicating with the plurality of data receiving ports 112 under a User Datagram Protocol (UDP).

Figure 5:
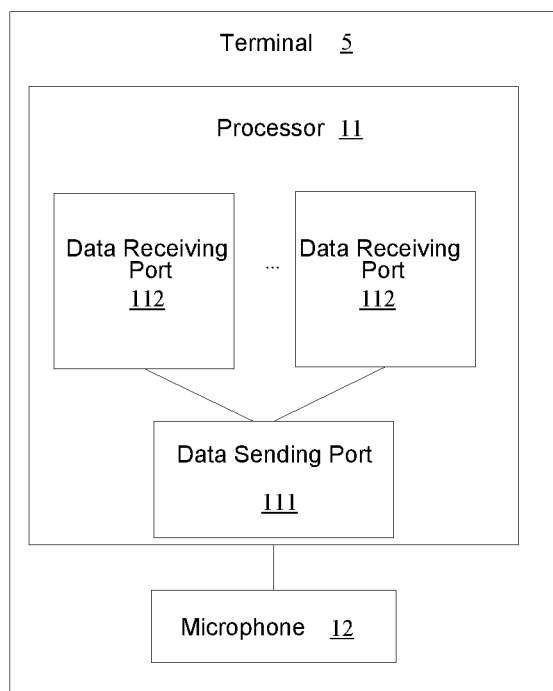
FIG. 5 is a block diagram of a terminal with a microphone provided by some embodiments of the present disclosure.

Some embodiments of the present disclosure provide a terminal. As shown in FIG. 5, the terminal 5 includes a microphone 12 and a processor 11 connected to the microphone 12. The processor 11 includes a data sending port 111 which is capable of communicating with the microphone 12, and a plurality of data receiving ports 112 which have a many-to-one mapping with the data sending port 111. The processor 11 is configured to receive an audio recording start command sent by the second application running on the terminal during that the microphone 12 is being used by the first application running on the terminal. In addition, the processor 11 is configured to assign a data receiving port 112 to the second application from at least one data receiving port, which is unoccupied, of the plurality of data receiving ports. Moreover, the processor 11 to acquire the audio recording data collected by the microphone 12 by using the data sending port 111 and to broadcast acquired audio recording data by using the data sending port. Furthermore, the processor 11 is configured to receive the recording data broadcasted from the data sending port by using assigned data receiving port 112 and to send received audio recording data to the second application by using the assigned data receiving port 112.

In some embodiments of the present disclosure, the recording start command includes at least one audio recording parameter required by the second application, and the at least one audio recording parameter includes one or more of following parameters: sampling rate, channel number, and audio recording format.

In some embodiments of the present disclosure, the processor 11 is further configured to convert the received audio recording data collected by the microphone 12 according to the at least one audio recording parameter required by the second application before the audio recording data is returned to the second application.

In some embodiments of the present disclosure, the first application is assigned another data receiving port 112 from at least one data receiving port, which is unoccupied, of the multiple data receiving ports.

In some embodiments of the present disclosure, the data sending port is capable of communicating with the plurality of data receiving ports 112 under a User Datagram Protocol (UDP).

It should be noted that the audio recorder in the above embodiments may be an individual processor or integrated in one processor of the terminal. In another example, the audio recorder may be stored in the memory of the terminal in the form of program code. Functions of the above units may be enabled and performed by a processor of the terminal. The processor here may be a Central Processing Unit (CPU) or an Application Specific Integrated Circuit (ASIC), or may be configured into one or more integrated circuits of the embodiments of the present disclosure.

In the terminal provided in the embodiments of the present disclosure, during that the microphone is turned on by the first application, the audio recorder of the terminal sends the audio recording data to the second section via the data receiving ports and the data sending port allocated to the second application. In this way, data may be reused in a similar way as network service, thereby solving the problem that other applications can't enable the audio recording function during that the microphone is used by an application.

In the above embodiments provided in the present disclosure, it should be understood that the disclosed terminal, apparatus, and method may be implemented in other manners. For example, the embodiments of the apparatus described above are merely exemplary. For example, the division of units is merely logical function division and may be other division in actual implementation. For example, multiple units or components may be combined or can be integrated into another system, or some features can be ignored or can't be executed. In addition, the shown or discussed mutual coupling or direct coupling or communication connection may be indirect coupling or communication connection through some interfaces, devices or units, and may be of electrical, mechanical or other forms.

The units described as separate components may or may not be physically separated. The components displayed as units may or may not be physical units, that is, may locate in one place or may also be distributed on multiple network units. Some or all the units may be selected according to actual needs to achieve the objectives of the solutions in these embodiments.

In addition, each functional unit in each embodiment of the present disclosure may be integrated in one processing unit, or each unit may be in one processing unit separately, or two or more units may be integrated in one processing unit. Above integrated unit can be implemented in the form of hardware or in the form of hardware plus software functional unit.

The above described integrated unit implemented in the form of a software functional unit may be stored in a storage medium readable to computer. Above software function unit is stored in a storage medium and includes several commands for enabling a computer device (which may be a personal computer, a server, or a network device) to perform partial steps of the method according to each embodiment of the present disclosure. The storage medium includes various types of medium that can store program code, such as a USB flash drive, a removable hard disk, a Read-Only Memory (ROM), a Random-Access Memory (RAM), a magnetic disk.

Finally, it should be noted that above embodiments are merely intended for describing the technical solutions of the present disclosure rather than limiting the present disclosure. Although the disclosure is described in detail with reference to the foregoing embodiments, it should be understood by those skilled in the art that modifications can be made to the technical solutions described in the foregoing embodiments, or equivalent replacements can be made to some technical features thereof. These modifications or replacements will not make the essence of the corresponding technical solutions depart from the spirit and scope of the technical solutions in the embodiments of the present disclosure.

What is claimed is:

1. A method for processing data obtained by a microphone of a device comprising, the method comprising:
    recording, using the microphone of the device, audio data for a first application running on the device, wherein the device comprises a data sending port in communication with the microphone and a plurality of data receiving ports having a many-to-one mapping relationship with the data sending port, wherein a first port of the plurality of data receiving ports is occupied by the first application;
    receiving, from a second application running on the device, an audio recording start command for using the microphone to start recording audio data for the second application, wherein the audio recording start command is received while the microphone is operated by the first application, and wherein a receiver is configured to receive the audio recording start command by invoking a Java interface, a JNI interface, audio recording code, and an audio recording framework in sequence, sending the audio recording start command to a hardware abstraction layer, and using the hardware abstraction layer to activate the microphone, wherein the audio recording start command comprises at least one audio recording parameter required by the second application, and the at least one audio recording parameter comprises one or more of: a sampling rate, a channel number, and an audio recording format;
    assigning, as an assigned data receiving port, an unoccupied data receiving port to the second application from the plurality of data receiving ports;
    acquiring, using the data sending port, the audio recording data obtained by the microphone;
    broadcasting, using the data sending port, the acquired audio recording data;
    receiving, using the assigned data receiving port, the audio recording data broadcasted from the data sending port;
    converting the received audio recording data according to the at least one audio recording parameter; and
    sending, using the assigned data receiving port, the converted audio recording data to the second application.

2. The method according to claim 1, wherein the first application is assigned another data receiving port from the assigned data receiving port.

3. The method according to claim 1, wherein, the data sending port is capable of communicating with the plurality of data receiving ports under a User Datagram Protocol (UDP).

4. An apparatus for processing data obtained by a microphone of the apparatus, the apparatus comprising:
    the microphone configured to record audio data;
    a receiver configured to receive, from a second application running on the apparatus, an audio recording start command for using the microphone to start recording audio data for the second application, wherein the audio recording start command is received while the microphone is operated by a first application, and wherein the receiver is configured to receive the audio recording start command by invoking a Java interface, a JNI interface, audio recording code, and an audio recording framework in sequence, sending the audio recording start command to a hardware abstraction layer, and using the hardware abstraction layer to activate the microphone, wherein the audio recording start command comprises at least one audio recording parameter required by the second application, and the at least one audio recording parameter comprises one or more of: a sampling rate, a channel number, and an audio recording format; and a processor in connection with a data sending port in communication with the microphone and a plurality of data receiving ports having a many-to-one mapping relationship with the data sending port, wherein a first port of the plurality of data receiving ports is occupied by the first application, and wherein the processor is configured to:

upon receiving the audio recording start command by the receiver, assign, as an assigned data receiving port, an unoccupied data receiving port to the second application from the plurality of data receiving ports;

acquire, using the data sending port, the audio recording data obtained by the microphone;

broadcast, using the data sending port, the acquired audio recording data;

receive, using the assigned data receiving port, the audio recording data broadcasted from the data sending port;

convert the received audio recording data according to the at least one audio recording parameter; and send, using the assigned data receiving port, the converted audio recording data to the second application.

5. The apparatus according to claim 4, wherein the first application is assigned another data receiving port from the assigned data receiving port.

6. The apparatus according to claim 4, wherein, the data sending port is capable of communicating with the plurality of data receiving ports under a User Datagram Protocol (UDP).

7. A device comprising:

a microphone configured to obtain audio data;

processing circuitry comprising a data sending port in communication with the microphone and a plurality of data receiving ports having a many-to-one mapping relationship with the data sending port, wherein a first port of the plurality of data receiving ports is occupied by a first application;

a non-transitory machine-readable medium storing instructions, the instructions configured to, when executed by the processing circuitry, cause the processing circuitry to:

receive, from a second application running on the device, an audio recording start command for using the microphone to start recording audio data for the second application, wherein the audio recording start command is received while the microphone is operated by the first application, and wherein the processing circuitry is configured to receive the audio recording start command by invoking a Java interface, a JNI interface, audio recording code, and an audio recording framework in sequence, sending the audio recording start command to a hardware abstraction layer, and using the hardware abstraction layer to activate the microphone, wherein the audio recording start command comprises at least one audio recording parameter required by the second application, and the at least one audio recording parameter comprises one or more of: a sampling rate, a channel number, and an audio recording format;

assign, as an assigned data receiving port, an unoccupied data receiving port to the second application from the plurality of data receiving ports;

acquire, using the data sending port, the audio recording data obtained by the microphone;

broadcast, using the data sending port, the acquired audio recording data;

receive, using the assigned data receiving port, the audio recording data broadcasted from the data sending port;

convert the received audio recording data according to the at least one audio recording parameter; and send, using the assigned data receiving port, the converted audio recording data to the second application.

8. The device according to claim 7, wherein the first application is assigned another data receiving port from the assigned data receiving port.

9. The device according to claim 7, wherein, the data sending port is capable of communicating with the plurality of data receiving ports under a User Datagram Protocol (UDP).

\* \* \* \* \*